United States Patent [19]
Gutierrez

[11] 3,812,975
[45] May 28, 1974

[54] INTER-ACTUATING RECORD HOLDING STRUCTURE

[76] Inventor: Julian Gutierrez, 6233 Brookview Ave. S., Minneapolis, Minn. 55424

[22] Filed: Mar. 26, 1973

[21] Appl. No.: 344,841

Related U.S. Application Data

[63] Continuation of Ser. No. 212,053, Dec. 27, 1971.

[52] U.S. Cl.................... 211/40, 211/11, 312/14
[51] Int. Cl............................................ A47b 81/06
[58] Field of Search............ 211/40, 11, 164, 169.1, 211/169, 170; 220/22; 312/193, 202, 10, 8, 13, 14, 17; 40/102, 104.03, 104.12, 104.17, 104.09, 104.11

[56] References Cited
UNITED STATES PATENTS
941,084    11/1909    Marsh.............................. 40/104.12
3,200,958   8/1965    Hudgeons............................. 211/4
3,446,360  10/1966    Gutierrez............................ 211/40
3,712,477   1/1973    Kieves.............................. 211/40

Primary Examiner—Roy D. Frazier
Assistant Examiner—Abraham Frankel
Attorney, Agent, or Firm—Leo Gregory

[57] ABSTRACT

A phonograph record holding apparatus comprising a multiplicity of pivotal record holding members with said members having inter-actuating portions comprising a rearward projecting pair of hooks of one of said holding members egaging a pair of forwardly projected pins of the adjacent holding member rearwardly thereof, said holding members being pivotally balanced whereby the forward tilt of the first of said holding members beyond its dead center point will cause the automatic forward successive tilting of the remainder of said holding members.

1 Claim, 5 Drawing Figures

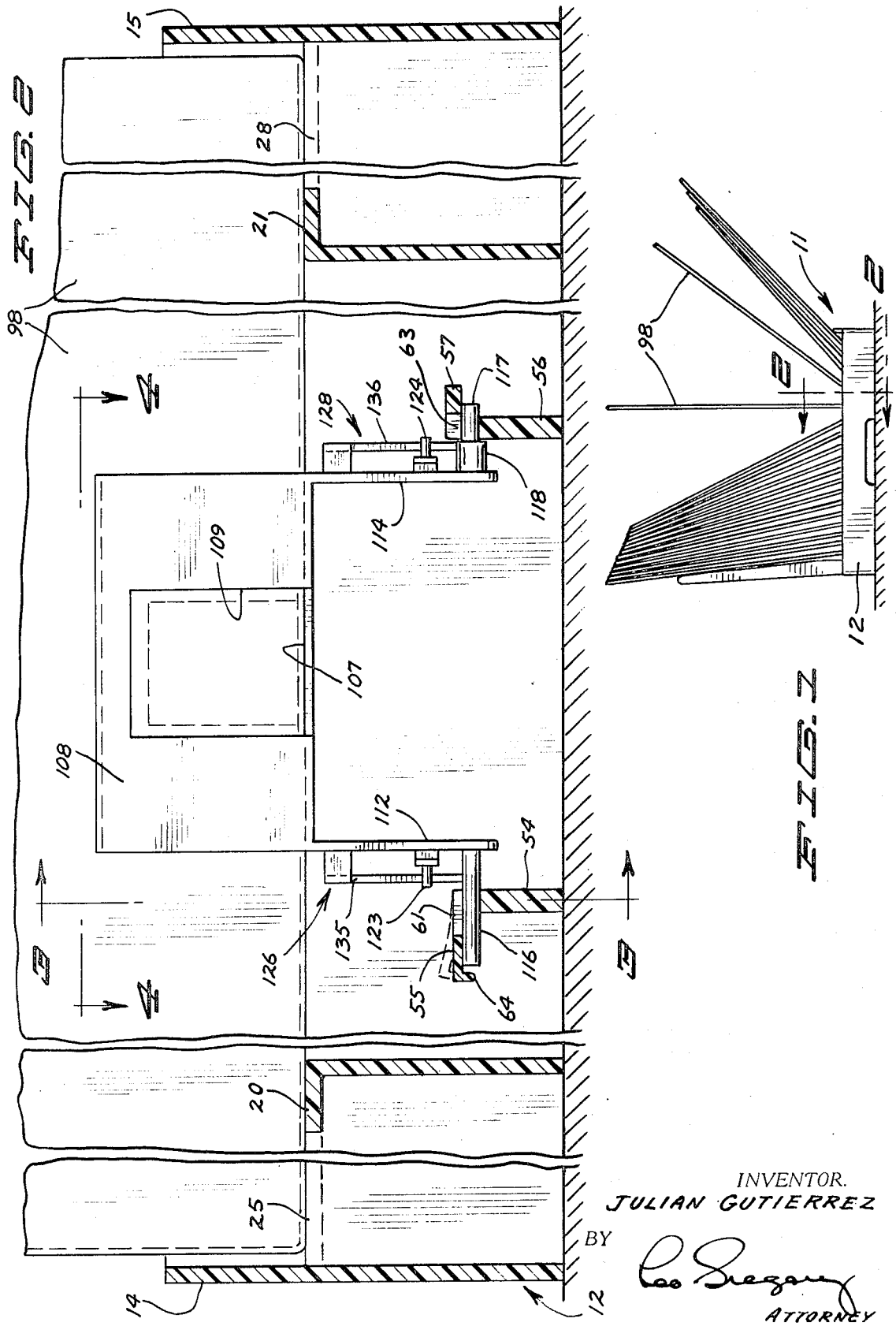

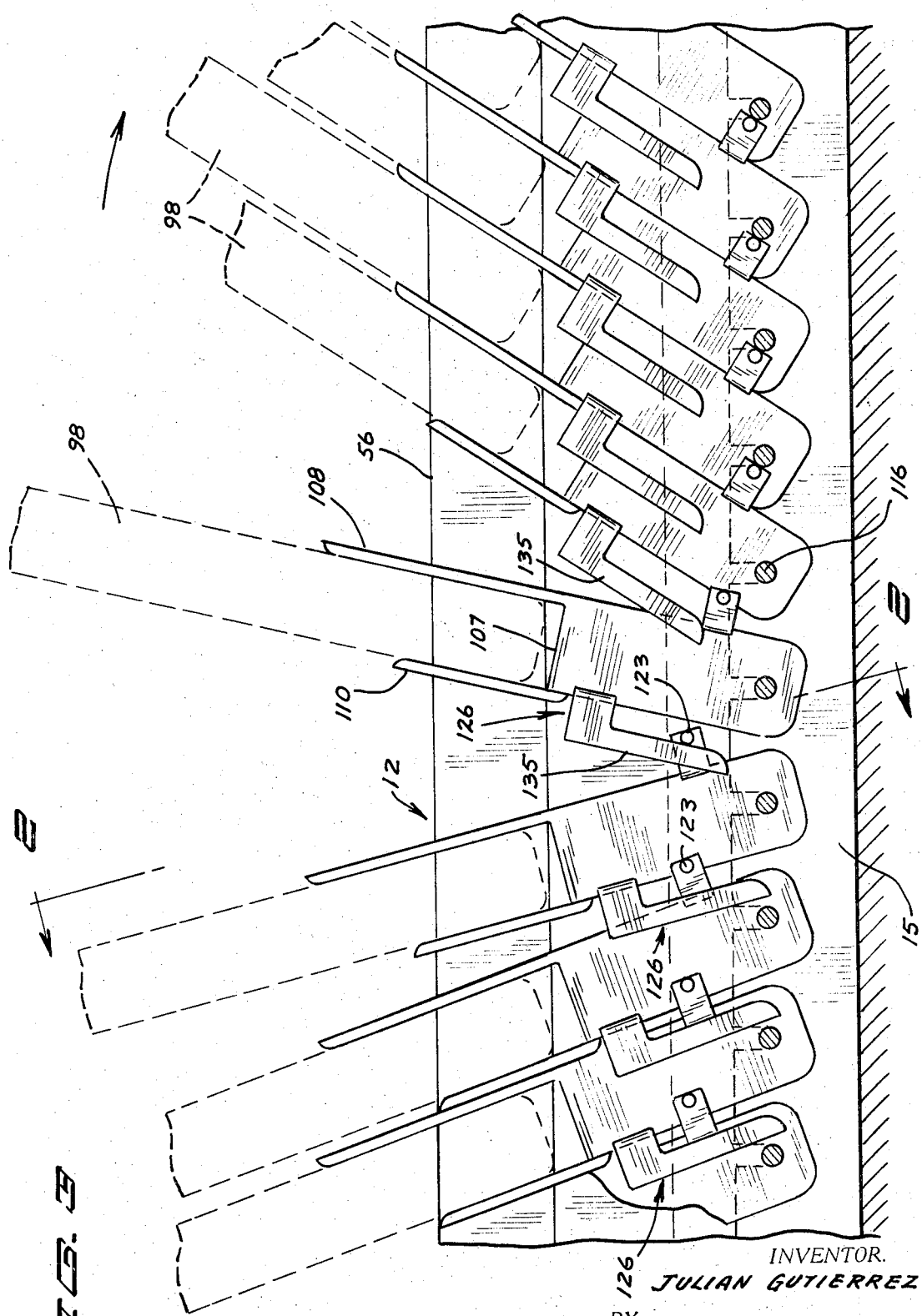

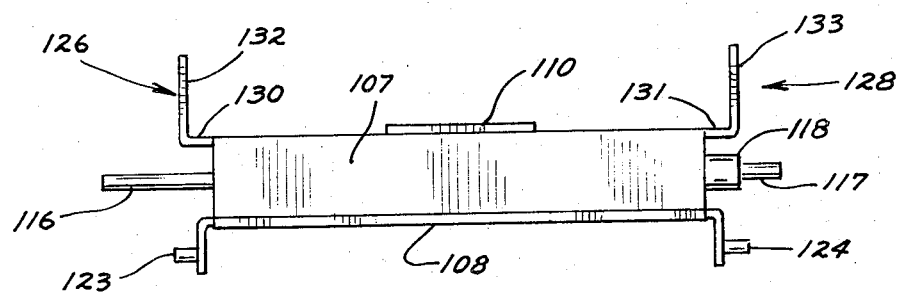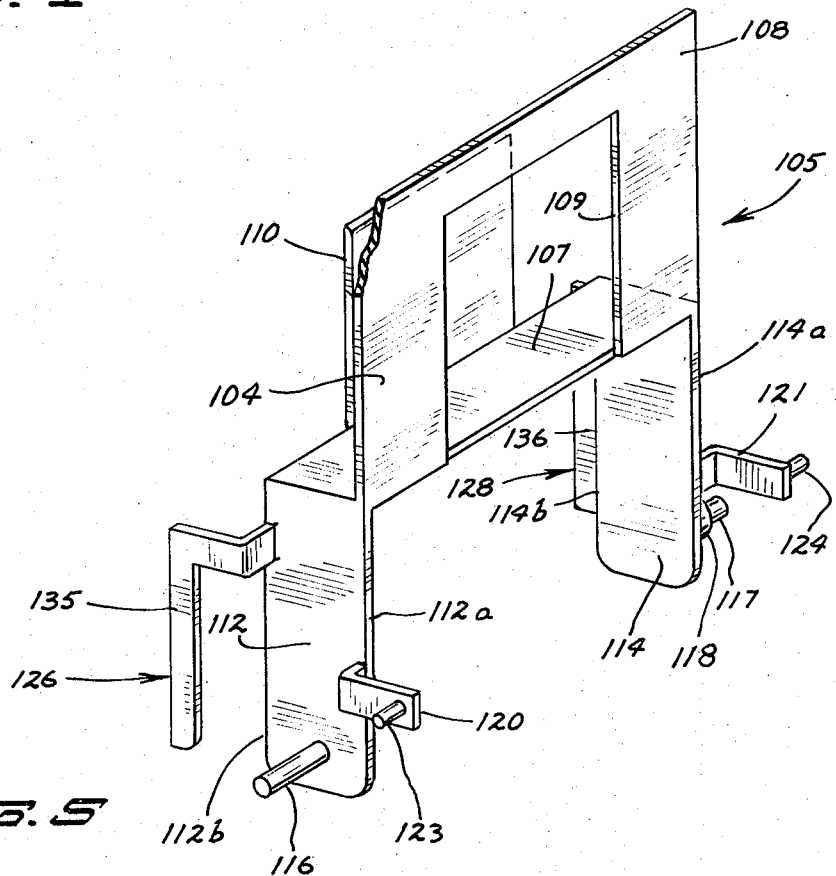

3,812,975

INTER-ACTUATING RECORD HOLDING STRUCTURE

This application is a continuation of application Ser. No. 212,053, filed Dec. 27, 1971.

BACKGROUND AND SUMMARY OF THE INVENTION

The invention herein relates to an apparatus for holding and displaying relatively flat items. Specific reference is made herein to phonograph records such as are generally contained within conventional jackets.

It is an object of this invention to provide a record holding apparatus which comprises inter-actuating record holding members which are easily and quickly installed into a base supporting structure.

It is also an object of this invention to provide inter-actuating record holding members having wall portions adapted to nest with adjacent such members to increase the length of arc through which said holding members may tilt.

It is a further object of this invention to provide inter-actuating record holding members respectively comprising a pair of spaced hook portions arranged and adapted to engage a pair of forwardly projecting pins of the adjacent holding member rearwardly thereof and said members being pivotally spaced so that upon the forward tilting of the first of said holding members, the remainder of said holding members tilt forwardly individually automatically in succession.

More specifically it is an object of this invention to provide a record holding apparatus for the pivotal display of records comprising record holding members each having a rearwardly extended hook portion at each end thereof, said hook portions being respectively arranged and adapted to engage a forwardly projected corresponding pin of the adjacent holding member rearwardly thereof, said hook portions and pins comprising inter-actuating members and each of aid holding members being pivotally disposed that upon the forward tilt of the first of said holding members, the remainder of said holding members rearwardly thereof automatically successively tilt forwardly.

These and other objects and advantages of the invention will be set forth in the following description made in connection with the accompanying drawings in which like reference characters refer to similar parts throughout the several views and in which:

FIG. 1 is a view in side elevation of the device herein on a reduced scale;

FIG. 2 is a broken view in transverse section taken on line 2—2 of FIG. 1 and on line 2—2 of FIG. 2, as indicated;

FIG. 3 is a broken view taken on line 3—3 of FIG. 2 showing a plurality of record holding members in successive operating positions and having portions thereof indicated by dotted line;

FIG. 4 is a view in horizontal section taken on line 4—4 of FIG. 2 as indicated; and FIG. 5 is a view in perspective of a record holding member of the device herein with a portion thereof being broken away.

DESCRIPTION OF A PREFERRED EMBODIMENT

The principal or essential subject matter comprising the invention herein relates to a holding member 105 of a device 11 of which the base or frame 12 is described in detail in the inventor's pending U. S. application Ser. No. 138,712 filed Apr. 29, 1971.

Incorporated herein by reference from said ending application is a portion of said frame which is non-essential to the invention herein and a portion of said frame is modified herein as will be described and like reference numerals are used to indicate like structure.

The portion of the frame 12 forming the direct supporting structure herein comprises the centrally disposed support plate members 54 and 56 having parallel facing sides and having upper oppositely extending flange portions or flanges 55 and 57 with said flange 55 having a somewhat greater width than said flange 57. Said flange 55 has a depending rib 64 along the outer side thereof which forms an end stop member for said shaft 116. Said flange is formed to have sufficient flexibility to yield upwardly as indicated in FIG. 2 to permit the shaft 116 to extend therebeyond.

Said flanges 55 and 57 and their respective supporting plate members 54 and 56 are modified from what is described in said pending application but only to the extent of being disposed in a relatively lower position within said frame 12 below the planes of the surface portions of strut members 20 and 21 as indicated in FIG. 2 herein and said support members have end portions integral with the end walls of said frame as by being molded into an integral structure therewith.

Said flange members 54 and 56 have aligned apertures 61 and 63 respectively extending therethrough directly under said flange 55 and 57.

Referring to FIGS. 4 and 5, said record holding member 105 is shown as a modification of the record holding member 70 described in said pending application.

Said member 105 is representative of all of the record holding members herein to be disposed in said frame 12 and only one of these will be described in detail. Preferably said record holding member will be unitarily formed such as by being molded of suitable plastic material and as such, it is here shown having a U-shaped upstanding body portion 104, depending leg portions and inter-actuating elements as will be described.

A bottom wall portion 107 forms the base of said U-shaped body portion and is substantially rectangular in plan having at one edge thereof an upstanding front wall 108 across the leading edge of said bottom wall portion and having a central cut-out portion 109 extending through the bottom thereof, as illustrated. Upstanding from the opposite outer edge of said bottom wall is a rear wall 110 disposed oppositely of said cut-out portion and is shown being of a size somewhat less in width and height than the width and height of said cut-out portion.

Said bottom wall in the embodiment of the invention here presented will be of a width to accommodate the thickness of a conventional envelope or jacket for a phonograph record.

Depending from either end of said bottom wall and of a width corresponding thereto are a pair of leg portions 112 and 114. Extending outwardly oppositely from the outer sides of said leg portions and adjacent the lower central portions thereof are a pair of stub shaft members 116 and 117, as indicated in FIG. 2. The shaft member 116 is of a somewhat greater length than the length of said shaft member 117. Said shaft member 117 has a spaced collar 118 formed thereon. This collar may be integrally molded with said shaft or placed thereon.

Said leg portions 112 and 114 are designated as having front edge portions 112a and 114a and rear edge portions 112b and 114b. Extending forwardly of said front edge leg portions 112a and 114a are a pair of forwardly angled plate members 120 and 121 respectively having short or stub shafts or pins 123 and 124 extending oppositely outwardly thereof in axial alignment with one another. Said plate members are illustrated as extending outwardly of as well as forwardly of said leg portions and positioned upwardly of the shafts 116 and 117 as shown in FIG. 5.

Extending rearwardly of said rear edge leg portions 112b and 114b are a pair of depending hook members 126 and 128.

Said hook members as here shown have portions 130 and 131 extending outwardly oppositely one another of the outer sides of said legs 112 and 114 adjacent the upper portions thereof and have rearwardly outwardly angled portions 132 and 133 extending therefrom which portions are angled downwardly to form depending arm portions 135 and 136 to define said hook members 126 and 128.

Disposed in said holding members for purposes of illustration are records 98 as indicated in FIGS. 1 and 3.

OPERATION

The record holding member 105 is positioned in frame 12 by having the shaft 116 disposed into one of the apertures 61 and having the rib portion 64 raised or flexed upwardly to have said shaft 116 extend beyond said rib to permit said shaft 117 to be disposed into the corresponding aperture 63. As said shaft 117 is moved into and through the aperture 63, the collar 118 forms a stop member to abut the plate member 56 and the shaft 116 is thus withdrawn sufficiently through aperture 61 to have the rib 64 assume its normal position to form a stop for the outer end of said shaft 116.

It is noted that the bottom wall 107 which is at a level substantially above the supporting shafts 116 and 117 is in the plane or at the level or the upper surface portions of the supporting members 20 and 21.

Thus said holding members will be positioned in all of the aligned apertures 61 and 63 of the frame 12 and each holding member may have disposed therein a record 98 as indicated in FIGS. 1 and 3.

The hook members 126 and 128 and their corresponding pins or pin members 123 and 124 form the inter-actuating portions of said holding members 105. Referring to FIG. 3, the forward portion of the frame 12 is to the viewer's right. Thus in FIG. 3 the forwardmost holding members are in their forward tilted positions.

Taking FIG. 3 in connection with FIG. 2 it is seen that the pairs of hook members 126 and 128 overlie and are disposed rearwardly of the corresponding pins 123 and 124. As one of the holding members is tilted forwardly, the hook members 126 and 128 thereof describe a circular path about the axes of the shafts 116 and 117 which brings said hook members into engagement with said pins 123 and 124 of the adjacent holding member therebehind at the point at which said tilted holding member passes forwardly of its dead center position. Said hook members and said pins are so positioned that at just over said dead center position, said hook members by said engagement with said pins have sufficient leverage to cause said adjacent holding member therebehind to tilt forwardly and in like manner the hook members of said adjacent holding member respectively engage the corresponding pin members of the holding member immediately therebehind. Thus a chain reaction is in effect in which one tilted holding member causes the automatic forward tilt of the holding member rearwardly thereof and in succession the remainder of the holding members are thus tilted forwardly.

The depending leg portions 112 and 114 are formed not to have any interengagement which might otherwise cause one holding member to have its depending leg portions engage those of the holding member rearwardly thereof and thus interfere with the inter-actuating engagement which has been described taking place between the hook members 126 and 128 and their correspondingly engaged pin members 123 and 124.

The holding members do not describe a large arc in tilting from a rearward rest position to a forward rest position but the action of each is independent of the holding members adjacent thereto and the cooperative inter-action is caused by the engagement of the hook members 126 and 128 with the corresponding pin members 123 and 124.

It will be understood that substantial leverage is exerted as a result of the records which are disposed within the holding members and that the records need not be of equal weight but of sufficient weight whereby when one record holding member tilts forwardly beyond its dead center position it will exert sufficient leverage to move the holding member immediately rearwardly thereof from a rest position to forward tilting movement.

Said holding members 105 are particularly formed to describe a length of forward tilting arc or travel greater than what would otherwise be permitted by the space relations between adjacent holding members with regard to their respective tilting axis. This is accomplished by nesting resulting from having the front walls 108 provided with cut-out portions 109 of such size as to receive therein the rear wall of the holding member forwardly thereof. Thus there is provided the additional length of forward travel to the extent of the thickness of said walls 110. With reference to FIG. 3, the holding members to the viewer's right are in forwardly tilted nested position.

With the hook members 126 and 128 and the pins 123 and 124 being present at each side of said holding members, there is a nicely balanced action in having said hook members engage corresponding pin members positioned as described.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A record holding device having inter-actuating record holding members, having in combination a pair of spaced elongated supporting members, said supporting members having transversely aligned pairs of apertures spaced longitudinally thereof, a plurality of record holding members each pivotally disposed in a successive pair of said aligned pairs of apertures, each of said holding members comprising a body portion having a substantially rectangular bottom wall, an upstanding rear wall at one edge of said bottom wall and an upstanding front wall at the other edge of said bottom wall, said front wall having a cut-out portion oppositely aligned with and being larger in extent than said rear wall, a leg portion depending from each end of said bottom wall, a pair of shafts extending outwardly of the outer sides of said leg portions oppositely of one another in axial alignment, a hook member extending rearwardly and downwardly from each of said leg portions, each of said leg portions having a forwardly extended portion with each of said extended portions having a stub shaft extending oppositely one another from the outer sides of said extended portions and in axial alignment with one another, each pair of said hook members extending over a pair of said last mentioned stub shafts carried by the adjacent holding member therebehind, said holding members being disposed in spaced relation such that when one holding member is tilted forwardly, its hook members will engage said last mentioned shafts of the adjacent holding member therebehind when said tilted holding member moves just beyond its dead center position to engage and move said holding member therebehind into a forward tilting position to a point just beyond its dead center position, and said front wall of each of said holding members having its cut out portion extending through its bottom wall to receive nested therein the rear wall of the holding member forwardly thereof with said holding members being in forwardly tilted position.

* * * * *